May 25, 1965 — H. A. KUHNE ETAL — 3,185,210

HIGH TEMPERATURE RECUPERATOR

Filed May 23, 1962 — 2 Sheets-Sheet 1

INVENTORS
Heinz A. Kuhne
Jobst W. Seehausen
Theodor von Gebhardi
BY
Frease, Bishop, Johns & Schick
ATTORNEYS May 25, 1965 H. A. KUHNE ETAL 3,185,210
HIGH TEMPERATURE RECUPERATOR
Filed May 23, 1962 2 Sheets-Sheet 2
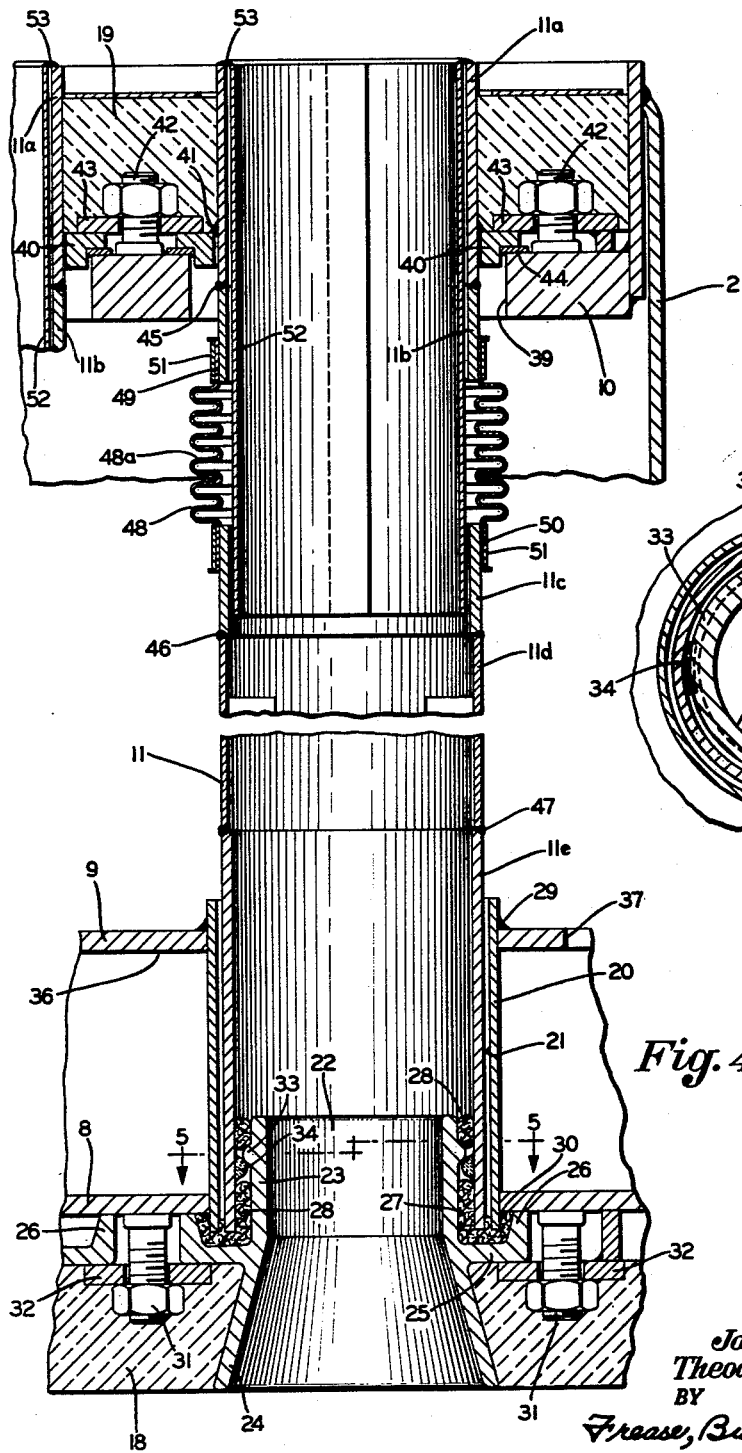
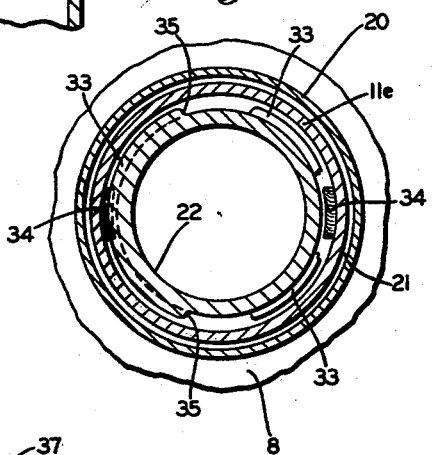
Fig. 5
Fig. 4
INVENTORS
Heinz A. Kuhne
Jobst W. Seehausen a
Theodor von Gebhardt
BY
Frease, Bishop, Johns & Schick
ATTORNEYS

United States Patent Office 3,185,210
Patented May 25, 1965

3,185,210
HIGH TEMPERATURE RECUPERATOR
Heinz A. Kuhne and Jobst W. Seehausen, Pittsburgh, and Theodor von Gebhardi, Allison Park, Pa., assignors to The American Schack Company, Inc., Pittsburgh, Pa., a corporation of Delaware
Filed May 23, 1962, Ser. No. 197,153
1 Claim. (Cl. 165—134)

This invention relates to heaters for air and other gases, and more particularly it pertains to recuperators for heating air by heat from waste gases.

Recuperators were originally developed for saving fuel by recovering heat from hot gases that would otherwise escape up a chimney from a metallurgical furnace. By using a recuperator, quantities of heat that have already left a furnace are utilized by returning the heat to the combustion air before the air enters the furnace. A saving is thus obtained in the over-all balance.

In the recovery of waste gas heat by preheating the air or gas in a recuperator, the fluid to be heated flows within tubes with the heating fluid flowing around the tubes in a combination cross-counterflow pattern. In the past preheated temperatures up to 1250° F. have been attained from heating fluids having temperatures up to 1700° F. Above that temperature various problems of operation and maintenance develop which require special consderations in order to operate for an extended period of time on an efficient basis.

Among the problems involved in the operation of a recuperator at high temperatures are periodic replacement of heat exchanger tubes, maintenance of air-tight fittings and parts between the heating and heated fluids, and periodic replacement of worn-out parts with a minimum of cost. It has been found that erosion and corrosion of parts due to mere passage of the waste heat gases requires an accelerated replacement program of heat exchanger tubes.

Associated with that problem is the maintenance of air-tight walls between the heating and heated fluids to prevent periodic changes of the atmosphere between reducing and oxidizing conditions which particularly hasten the corrosion problem. In that respect it was found heretofore that the use of welding at joints between different parts eliminated air leakage which in turn prevented air from mixing with the heating gases.

Where air is prevented from leaking into the tubes carrying the hot gases, an oxidizing atmosphere is normally maintained and the corrosive effects of an atmosphere alternating between reducing and oxidizing conditions is avoided. Such alternating conditions are regarded as conducive to a hgher rate of tube corrosion which ultimately results in tube failure, air leakage, and fire in the recuperator due to burning of the waste heat gases.

In the past, special precautions have been taken to use materials that could withstand the high temperatures of operation. It has been found, however, that although heat-resistant steel tubes or other metal elements are used, the problem of avoiding corrosion is not completely satisfied. Such materials merely extend the useful life of the recuperator, but do not eliminate the ultimate problem of replacing the tubes, which necessitates shutting down the recuperator.

Associated with the foregoing is the problem of expansion of the tubes during a preliminary heating to operating temperatures. An apparently minor change in a particular connection between parts of the recuperator involves the necessity of making a series of other changes to eliminate a chain of events due to the first change. With the prior welded constructions it was found that the welded connection between the lower end of the tubes and the tube sheet required the application of an overhead weld which is difficult and time-consuming in small quarters. In addition, the lower end portion of the tube was subject to considerable erosion due to the passage of the waste heat gases at very high temperatures, such as 1800° F.

It has been found that the foregoing problems can be resolved by the use of a heavy duty casting at the inlet end of the tube. Such a casting has an outwardly flared lower portion and an upper portion having a pair of concentric, upwardly extending flange members within which the lower end of a heat exchange tube may be seated. The castng and the tube are provided with cooperating bayonet joint members by which the casting and tube are clamped tightly together. With the casting clamped in place on the tube sheet, an air-tight fitting is provided between the casting, the tube sheet, and the lower end of the tube by packing of a type that remains relatively pliable at high temperatures of operation.

The upper ends of the tubes are secured to the tube sheet in a detachable manner which avoids the destruction of welds and adjacent material with a minimum of time. Although welds are used at the upper end of the tube to provide air-tightness between the tube and a protective sleeve, such parts are secured to the tube sheet by clamps which are in turn sealed in place by insulation, which prevents leakage of air and/or gases between opposite sides of the tube sheet and primarily at the tube sheet connection with the tube. As a result of such construction, the tubes may be replaced from time to time in a more expeditious manner and the recuperator is back in operation in a minimum of time.

Generally, it is an object of this invention to provide a high temperature recuperator having heat exchanger tubes and associated parts which are conducive to easy periodic replacement of the tubes.

It is another object of this invention to provide a high temperature recuperator which enables individual expansion of heat exchanger tubes between spaced tube sheets.

It is another object of this invention to provide a high temperature recuperator having vertical heat exchange tubes, in which the lower end connections of the tubes to the tube sheet are devoid of welded joints.

It is another object of this invention to provide a high temperature recuperator to provide a heavy duty casting which surrounds the lower end of a heat exchange tube to protect the tube and its associated connecting parts against the corrosive effect of high temperature waste gases.

It is another object of this invention to provide a high temperature recuperator having an upper end connection with a tube sheet which facilitates easy replacement of the tube as well as an expansion joint in the tube.

It is another object of this invention to provide a high temperature recuperator having a plurality of heat exchanger tubes which include expansion portions to accommodate thermal expansion of the tubes during the preliminary heating periods and which expansion portions are preliminarily expanded to a precalculated extent for the purpose of minimizing the stresses on the expansion portion at elevated temperatures of operation.

Finally, it is an object of this invention to provide a high temperature recuperator having heat exchanger tube-to-tube-sheet connections which provide air-tightness without welds between replaceable and permanent parts, and which are conducive to replacement of tubes with a minimum of time and effort.

These and other objects and advantages, apparent to those skilled in the art from the following description and claims, may be obtained, the stated results achieved, and the described difficulties overcome, by the apparatus, constructions, arrangements, combinations, subcombinations, elements, parts, and principles, which comprise the present invention, the nature of which is set forth in the foregoing general statements, a preferred embodiment of which—illustrative of the best mode in which applicants have contemplated applying the principles—is set forth in the following description and shown in the drawings, and which is particularly and distinctly pointed out and set forth in the appended claims forming part hereof.

Generally, the recuperator of the present invention for use at very high temperatures may be stated as including a vertical pressure shell forming a heat exchange compartment, a tube sheet at each end of the shell for closing the compartment, the shell having inlet and outlet ports for combustion gases, a heat exchange tube extending through the compartment and having opposite end portions secured to and extending through the tube sheets, a first head member connected to one end of the shell forming an inlet head chamber for exhaust gases, a second head member connected to the other end of the shell forming an outlet head chamber for exhaust gases, the lower tube sheet including a tube sheet cooling chamber through which combustion air circulates, the lower end of each heat exchange tube extending through the cooling chamber and communicating with the inlet head chamber, a tube inlet member detachably mounted on the lower tube sheet on the side facing the inlet head chamber, each tube inlet member including an inner cylindrical portion extending telescopically into the lower end portion of each tube and having an integral lower portion in the form of a truncated cone facing the inlet head chamber, the tube inlet member also including a radially-extending peripheral flange having an outer cylindrical portion which with the peripheral flange and the inner cylindrical portion forms an annular trough means for receiving the lower end portion of one tube, packing within spacing between the several parts of the inlet member and the end portion of the tube in a fluid-tight manner, means for securing the tube in place with respect to the tube inlet member which means includes a bayonet joint, and the upper end of each tube being detachably mounted on the upper tube sheet in a fluid-tight manner.

In the accompanying drawings, which are illustrative of the preferred embodiment of the invention, by way of example, and in which similar numerals refer to similar parts thereof:

FIG. 4 is an enlarged fragmentary vertical sectional view showing a heat exchange tube and its connection between upper and lower tube sheets; and FIG. 5 is a horizontal sectional view taken on the line 5—5 of FIG. 4.

Figure 1:
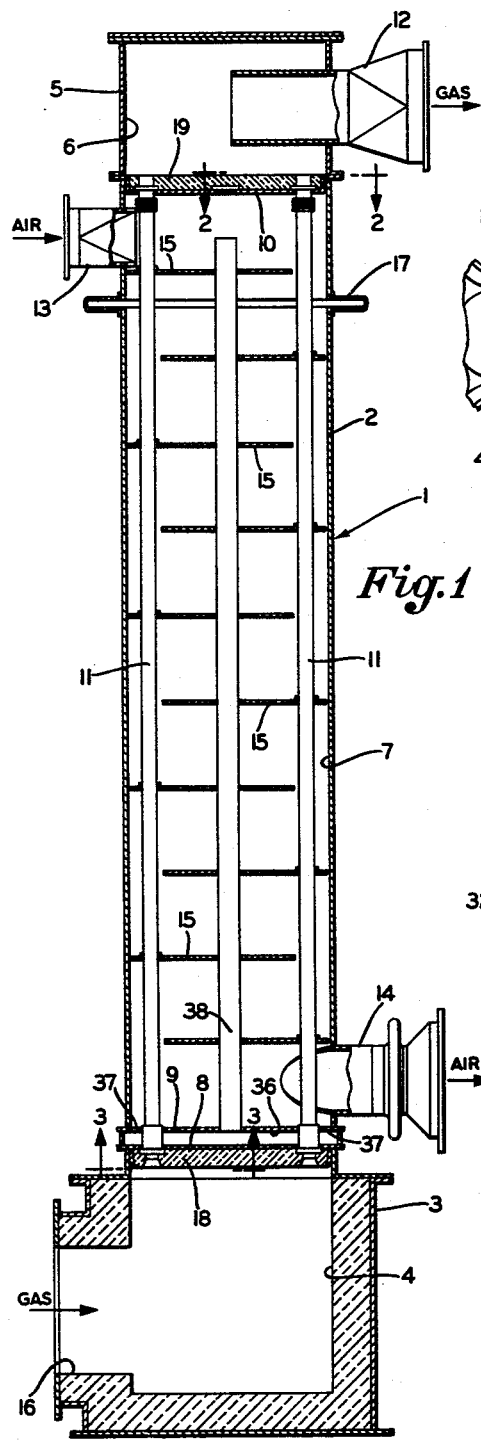
FIGURE 1 is a vertical sectional view showing a recuperator for the heat exchange between high temperature waste gases and combustion air.

In FIG. 1 a recuperator is generally indicated at 1. It includes an annular shell 2, the lower end of which is supported on a base 3 which provides a gas inlet chamber 4. The upper end of the shell is covered by a header 5 which provides a gas outlet chamber 6.

The shell 2 provides a shell chamber 7, the lower end of which is closed by a pair of spaced tube sheets 8 and 9. Likewise, the upper end of the chamber is covered by a tube sheet 10. Within the shell a plurality of heat exchange tubes 11 extend between and through the tube sheets 8, 9, and 10 and communicate with the gas inlet and gas outlet chambers 4 and 6. The heat exchange tubes 11 conduct waste heat gases from the chamber 4 to the chamber 6 from where they flow through a gas outlet port 12. Within the shell chamber 7 combustion air circulates downwardly from an air inlet port 13 to an air outlet port 14. For that purpose a plurality of vertically spaced, horizontally baffle plates 15 are disposed in the shell to provide a zigzag flow path for the air to assure contact with all of the vertical tubes 11.

The waste gases enter the recuperator 1 through an inlet port 16 at a temperature of approximately 1800° F. The gases move from the chamber 4 and through the tubes 11 to the chamber 6 from where they pass out of the recuperator through the gas outlet port 12 at a temperature of approximately 1000° F. The combustion air to be heated enters through the air inlet port 13 and passes in a zigzag path as defined by the baffle plates, in intimate contact with the tubes 11 to the air outlet port 14 at the lower end of the shell. The air enters at approximately 60° F. and exits at approximately 1400° F.

Due to expansion of the shell 2 at operating temperatures, a thermal expansion joint 17 is mounted in the shell, as shown in FIG. 1.

The manner in which the tubes 11 are mounted in and between the tube sheets 8, 9, and 10 is shown in FIG. 4. The lower end of the recuperator 1 is hotter than the upper end because of the high temperature (1800° F.) of the incoming waste heat gases. For that reason the lower tube sheet 8 is provided with a heat insulation coating 18. A similar coating 19 is also applied to the upper side of the upper tube sheet 10. As shown in FIG. 4, the tube sheets 8 and 9 are provided with aligned openings through which extends a sleeve 20. The lower end portion of the tube 11 extends through the sleeve and preferably provides a clearance 21 to facilitate insertion and removal of the tube 11 when necessary.

At the lower end of each tube 11 a tube inlet member 22 is provided for the multiple purpose of sealing the lower ends of the sleeve 20 and the tube 11, as well as providing a support for the tube. The member 22 is preferably a casting having heavier walls than the tube 11 and includes an upper cylindrical portion 23, a lower outwardly flared portion 24, and a radial flange portion 25 having an upturned, longitudinally extending cylindrical portion 26, which extends annularly around the member.

The cylindrical portion 26 together with the portion 25 and the upper cylindrical portion 23 provide an annular trough 27 in which the lower end of the tube 11 is seated and in which packing 28 is disposed in the spacings between the cylindrical portion 23, the tube 11, the sleeve 20, and the cylindrical portion 26 in a fluid-tight manner. The packing 28, being composed of a pliable material such as synthetic glass fiber, provides a suitable seal between the chambers 4 and 7 as well as between the several members between which it is disposed. The sleeve 20 is fixed in place with the upper end secured to the tube sheet 9 by an annular weld 29 and the lower end secured to the tube sheet 8 by an annular weld 30.

Figure 3:
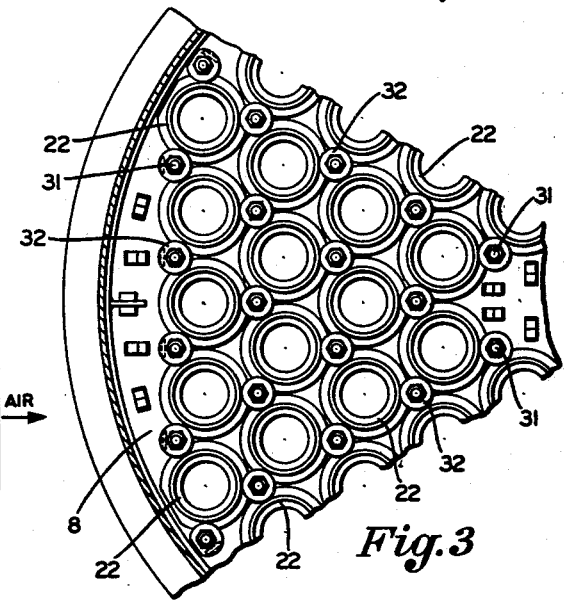
FIG. 3 is an enlarged fragmentary plan view, taken on the line 3—3 of FIG. 1.

The member 22 is secured tightly in place with the upper end of the flange portion 26 secured against the underside of the tube sheet 8 by clamping means including a nut and bolt assembly 31 and a washer 32. The assembly of the clamping means and the inlet members 22 is shown more particularly in FIG. 3.

Each tube 11 is secured in place against upward accidental lifting by bayonet joint means including interengaging bayonet members 33 and 34 on the facing walls of the members 22 and the tube 11. As shown more particularly in FIG. 5, the bayonet members 33 and 34 are provided in pairs with the members 34 being diametrically opposite to each other and adapted for alignment with notches 35 between the members 33. Accordingly, each tube 11 is seated in place between the sleeve 20 and cylindrical portion 23 by sliding the bayonet members 34 vertically through the notches 35 and then turning the tube through a 90° arc with the members 34 below and in engagement with the members 33.

Inasmuch as the lower end of the recuperator is the hotter end, a cooling chamber 36 is provided between the spaced tube sheets 8 and 9. The chamber 36 communicates with the shell chamber 7 by a plurality of spaced openings 37 (FIG. 1) in the tube sheet 9 at the peripheral portion thereof adjacent the inner surface of the shell 7. In that manner air within the shell chamber 7 circulates into the chamber 36 through the openings 37 where it cools the tube sheet 8 as well as the lower ends of the tubes 11, the sleeve 20, and other associated parts.

A vent tube 38 extends centrally from the center of the chamber 36 to the upper end of the shell chamber 7 so that the heated air in the chamber 36 may move through the vent tube 38 and back into the shell chamber. In that manner the heated air entering the chamber 36 is recirculated through the chamber 7.

Figure 2:
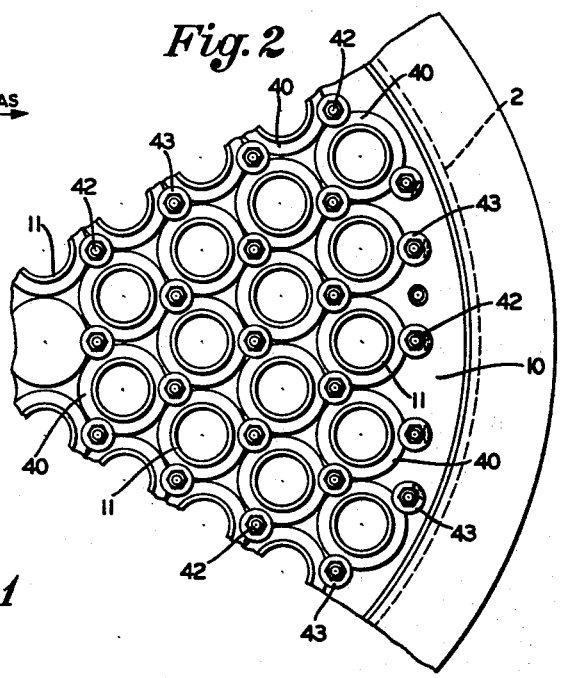
FIG. 2 is an enlarged fragmentary plan view, taken on the line 2—2 of FIG. 1.

The upper ends of the several tubes 11 are secured in place as shown in FIG. 4. The tube sheet 10 is provided with openings 39 through which the upper ends of the tube extend. A centering ring 40 is welded by weld 41 to the outer surface of the tube 11. Each ring 40 is clamped in place by clamping means including nut and bolt assembly 42 and washer 43. An annular packing ring 44 is provided between each centering ring 40 and the tube sheet 10 around each corresponding opening 39. The manner in which the several tubes 11 are secured in place is shown in FIG. 2. Like the heat insulating coating 18, the coating 19 is chipped away when access is necessary to the clamping means including the nut and bolt assembly 42 and the washer 43 for removing the tubes 11.

Each tube 11 may be composed of a single unitary member or it may be composed of several portions of different types of metal, depending upon the operating conditions of the particular recuperator. Where the tube is composed of several different materials, the upper end portion 11a including a portion 11b are welded together by an annular weld 45 and may be composed of type 446 stainless steel. The tube 11 may also include a portion 11c which is likewise preferably composed of type 446 stainless steel. An intermediate portion 11d of tube 11 is secured at the upper end by a weld 46 to the lower end of the portion 11c, and the lower end of the tube portion 11d is secured by an annular weld 47 to a lowermost portion 11e.

The intermediate portion 11d is preferably composed of type 430 stainless steel having lower chromium content than type 446 which is necessary for the upper and lower tube portions 11a, 11b, 11c, and 11e, which portions are also preferably of greater wall thickness than the intermediate portion 11d.

Inasmuch as the tube 11 is subjected to higher temperatures during normal operation of the recuperator, the tube is provided with a thermal expansion joint 48 which includes a bellows 48a having an upper cylindrical end portion 49 and a lower cylindrical end portion 50 which are secured tightly against the tube portions 11b and 11c, respectively, by similar securing bands 51. The expansion joint 48 is protected from the waste gases passing through the tube 11 by an inner sleeve 52 which extends downwardly into the tube 11 to a location below the joint 48. The upper end of the sleeve 52 is secured to the upper end of the tube 11 by an annular weld 53.

When the tube 11 is installed it is normally installed in a length whereby the expansion joint 48 is extended for a precalculated distance. The degree of extension during installation is dependent upon the length of the tube as well as the coefficient of expansion of the materials thereof. When the recuperator 1 is heated to normal operating conditions the expansion of the tube 11 due to the elevated temperature releases to the pre-expanded condition of the joint 48.

In the foregoing description certain terms have been used for brevity, clearness and understanding, but no unnecessary limitations have been implied therefrom as such words are used for descriptive purposes and are intended to be broadly construed.

Moreover, the embodiment of the improved construction illustrated and described herein is by way of example and the scope of the present invention is not limited to the exact construction shown.

Having now described the invention, construction, operation and use of a preferred embodiment thereof and the advantageous, new and useful results obtained thereby, the new and useful high temperature recuperator and reasonable mechanical equivalents thereof obvious to those skilled in the are are set forth in the appended claim.

What is claimed is:

In a high temperature recuperator wherein a plurality of heat exchange tubes extend through a heat exchange chamber formed by a vertical shell, wherein the upper and lower ends of the tubes are detachably mounted in upper and lower tube sheets at opposite ends of the chamber, wherein the shell has inlet and outlet ports for the heated medium, wherein a head wall is provided at one end of the shell forming an inlet head chamber on the side of one tube sheet opposite the shell chamber and another head wall is provided at the other end of the shell forming an outlet head chamber on the side of the other tube sheet opposite the shell chamber, wherein the inlet head chamber has an inlet port for the heating medium and the outlet head chamber has an outlet port for said medium, the improvement including a tube member on the lower end of each tube detachably mounted on the lower tube-sheet at the entry end of the tube, said member having an inner tubular wall forming a central bore and extending into the end of the tube and having an integral flared wall extending outwardly from the inner tubular wall and beyond the end of the tube, the tube inlet member also having a radial annular flange forming a shoulder facing the flared wall and having an outer tubular portion concentric with said inner tubular wall and forming a tube-receiving annular trough with the inner tubular wall, the inner tubular wall having a diameter less than and forming an annular clearance with the entry end of the tube, the tube and inner tubular wall having detachable interlocking members extending across the annular clearance, the outer tubular wall being shorter than the inner tubular wall and forming a tube-sheet contact surface on the end of said outer tubular wall opposite the shoulder, clamping means engaging the shoulder of the flange for detachably mounting the tube inlet member on the tube sheet with the tube-sheet contact surface against the tube sheet, and packing means within the clearance and the annular trough for sealing the interlocked members together.

References Cited by the Examiner

UNITED STATES PATENTS

| | | | |
|---|---|---|---|
| 790,977 | 5/05 | Peck | 285—331 |
| 1,932,610 | 10/33 | Tilley | 165—83 X |
| 2,413,360 | 12/46 | Maguire et al. | 165—134 X |
| 2,512,748 | 6/50 | Lucke | 165—175 |
| 2,834,581 | 5/58 | Schefels et al. | 165—178 X |

FOREIGN PATENTS

| | | |
|---|---|---|
| 147,959 | 8/52 | Australia. |
| 1,026,716 | 2/53 | France. |
| 1,178,105 | 12/58 | France. |
| 291,551 | 1/28 | Great Britain. |
| 63,986 | 4/47 | Norway. |

CHARLES SUKALO, *Primary Examiner.*